Patented May 13, 1952

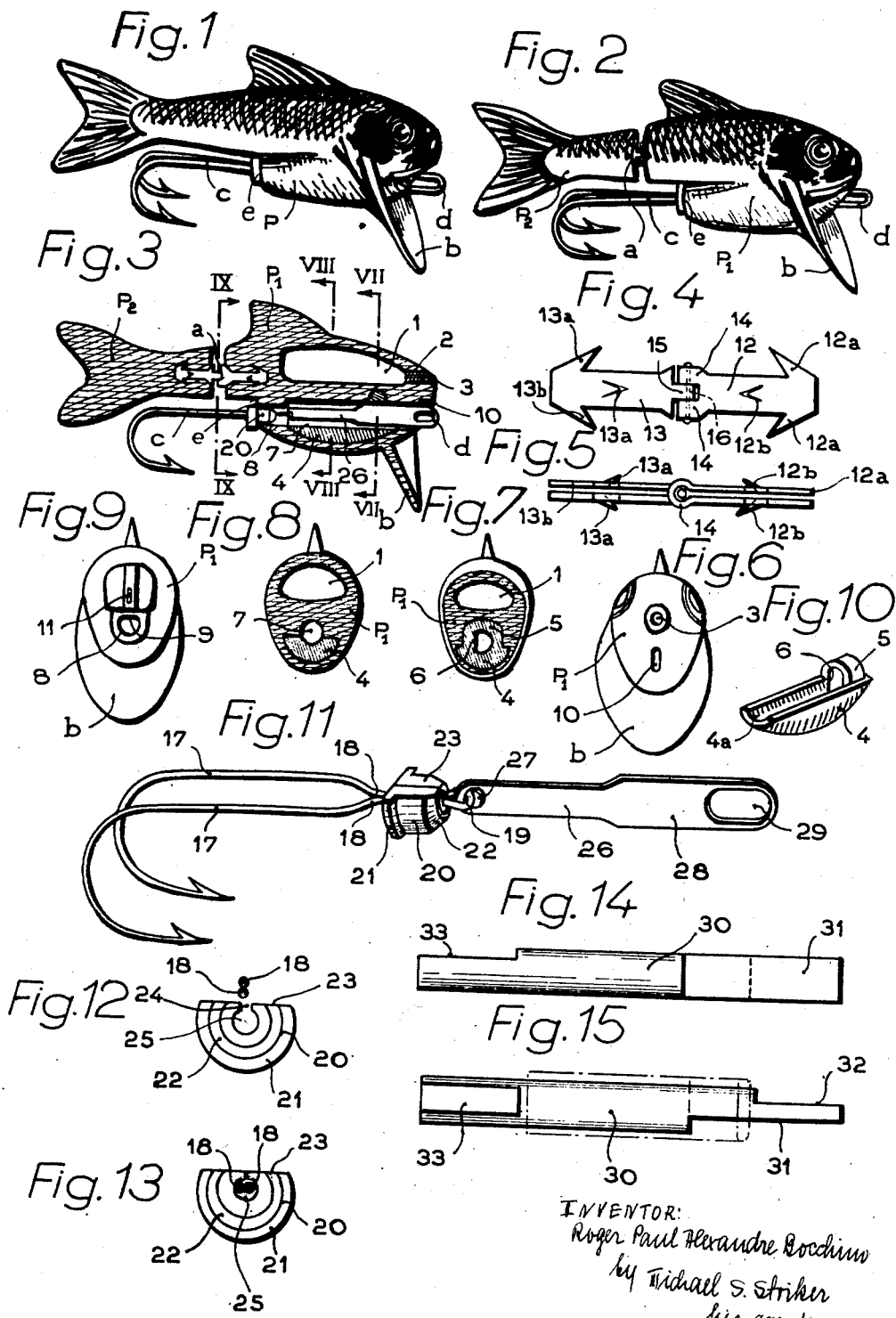

2,596,201

UNITED STATES PATENT OFFICE 2,596,201

ARTIFICIAL DECOY FISH

Roger Bocchino, Paris, France

Application March 16, 1948, Serial No. 15,143
In France February 17, 1943

13 Claims. (Cl. 43—42.04)

The object of my invention is an artificial decoy for catching fish of the cannibalistic species. As all fishermen know, decoys of this kind have already been put on the market, that are of some stiff material such as wood or plastic made to look like a real fish and with hooks suitably arranged and fixed rigidly with the body of the dummy fish. This body that may be formed of one single piece or of several portions hinged together, contains at its front end a symmetrically arranged vane, made of a separate piece of metal as a rule, that imparts to it, when fishing, a side fluttering effect that makes it a more tempting looking bait.

This style of bait, as a consequence of its uniform structure, is not perfectly stabilised in a vertical plane and often has a tendency to turn over on itself, especially in rapids or strong currents. In the case of casts after a corresponding slackness of line, made by a fisherman, the bait moves like something inert and has not the slightest look of a real fish. The bait therefore is of very little use in fishing especially under the two conditions that have been mentioned above.

The decoy swimming fish made up in accordance with my invention, does away with this unsatisfactory feature. It is characterized by the fact that it contains inside the body a symmetrical lead weight placed below the axis and offset from the centre at the front end, which has the effect of ensuring always its complete stability in a vertical plane when cast, and gives it the appearance of a real fish.

In accordance with another characteristic of the invention, the front portion of the body of the decoy includes below its axis of symmetry a longitudinal passage of which the geometrical axis is placed in the plane of symmetry and that emerges, on the one hand, underneath the front end of the body and, on the other hand, substantially in its middle portion, this passage being planned to take a link connected to the hook or hooks and of which the front end is tied to the end of the line, while a checking means fixed rigidly with the metal frame of the hook-gear engages with this passage so as to hold the whole thing in the normal position for fishing but to allow the body of the bait to slide on the end of the line when a fish goes after the bait.

This sort of arrangement, that has been put into use already in spinners, bestows a great advantage on the fish decoy made up according to my invention in regard to fish decoys now on the market in which the hooks are connected permanently to the body of the bait on which body the fish presses, as soon as it strikes, to try and get off the hook.

In accordance with still another characteristic of my invention, the body of the decoy fish is formed altogether of a flexible molded material such as rubber under all its forms, latex, para, its substitutes, or compounds or pliable plastic substances.

This kind of making has a great advantage over stiff component parts. As a matter of fact, in the first place, the fish, as soon as it nibbles at the bait and before actually striking, bites on a very good imitation as far as consistency goes, of the flesh of a real fish and does not notice its mistake. On the other hand, when it strikes, it cannot press against the body of the decoy to try and get off the hook since the decoy can change shape sideways. Finally, the makeup of the vane in some flexible material in one with the body of the bait eliminates any danger of getting out of shape or breaking through hitting on something hard, such as pebbles or rocks.

The body of the bait will be obtained preferably by molding with the constituent material introduced under pressure into a mold containing the lead weight offset from the centre.

The fish-decoy in accordance with my invention is characterized, besides, by the fact that it contains at its front part and above the axis of symmetry a symmetrical air-pocket.

This air-pocket increases its stability in a vertical plane, decreases its weight, thus allowing the line to be wound in more slowly in shallow currents and, above all, increases the pliability of the bait that is made anyhow of flexible material. Finally, it allows the lowering of the axis along which the bait is pulled in and ensures for it an optimum fluttering effect; this position of the axis along which the line is wound in results, besides in releasing the hook-gear at the first nibble of a sporting fish.

This air-pocket may be formed to advantage by introducing into the mold a drift fixed rigidly with a rod allowing it to be taken out after molding by reason of the elastic nature of the constituent material; the hole through which this rod goes is closed up subsequently by a plug made, for instance, of the same material as that of the body and fastened in, preferably, by a few drops of a suitable solvent.

According to a recommended form of execution of my invention, the body of the decoy fish is made up of two portions of pliant molded material each provided with a small rectangular housing into each of which is inserted the end of a rectangular metal strip folded back on itself so as to form one of the sets of knuckles of a hinge, while the surfaces of this strip are provided with sharp points that are headed in such a way that they oppose the withdrawal of the set of knuckles.

Two recommended forms of execution of my invention are illustrated as examples in the accompanying drawings in which:

Fig. 1 is a perspective view of an artificial swimming fish decoy made of pliant material in accordance with the invention.

Fig. 2 illustrates similarly a two-part hinged fish decoy of flexible material.

Fig. 3 is a longitudinal section of the decoy fish shown in Fig. 2.

Figs. 4 and 5 are an elevational view and a plan view of the hinge joining up the two component parts of the decoy fish.

Fig. 6 is a front view of the decoy.

Fig. 7 shows a transversal section of it through line VII—VII of Fig. 3.

Fig. 8 is a transversal section of it through line VIII—VIII of Fig. 3.

Fig. 9 is a transversal section of it through line IX—IX of Fig. 3, with the hinge assumed to be removed.

Fig. 10 is a perspective view of the lead offset from centre and embedded in the molding.

Fig. 11 is a perspective illustration on a large scale of the mounting of the decoy fish.

Figs. 12 and 13 are end views showing the setting on the hook-gear of the stop fixing the position of the body of the decoy.

And Figs. 14 and 15 show respectively in elevation and plan the drift allowing the covering of the offset lead weight during molding.

In Fig. 1, the fish decoy is formed by a body P in the form of a fish, except at its lower middle portion that shows a fairly marked step $e$ and is provided at the front end with a vane $b$ also of flexible material and obtained together with the body. This symmetrical vane of slightly concave shape headed forwardly has a slope such that its intersection with the symmetrical plane of the body forms an angle ranging between 50° and 70° with the axis of the body; this arrangement imparts short quiverings to the bait giving it a highly realistic appearance. This bait is finished off by a hook-gear $c$ that will be described later and of which the end $d$, allowing the attachment to the end of the fishing line, projects slightly at the front end.

Fig. 2 illustrates a recommended form of execution of a fish decoy in accordance with my invention and that is formed by two principal front and rear component parts $P_1$, $P_2$ that are linked together by a hinge $a$ and correspond respectively to the front portion and the tail end of the fish.

A hook-gear $c$ similar to the previous one finishes off the bait.

Since the makeup of the bait is exactly the same for both forms of execution except for the body that may be in one piece or two, only the form of execution illustrated in Fig. 2 will be described. A longitudinal section through the axis of symmetry is shown in Fig. 3.

The body portion $P_1$ contains in its upper portion an air-pocket extended by a passage 2 that is flush with the lower level of the pocket. This passage is closed by a cylindrical plug 3 formed preferably of the same sort of material out of which the body is made and that is fastened by sticking for instance with the aid of a few drops of some solvent. This pocket is obtained when molding preferably by introducing into the mold a drift of the same shape that is subsequently withdrawn easily as the material is elastic.

The body $P_1$ includes, besides, a longitudinal passage that is broken up into three portions and that is arranged symmetrically with reference to its longitudinal plane of symmetry; the three portions are: a front part 10 (Fig. 6) of elongated rectangular section, a central portion 7 (Fig. 8) of cylindrical section and a cylindrical rear portion 8 (Fig. 9) showing a flat part 9 on its upper surface.

In the lower portion of the body $P_1$ is embedded, when it is being molded, as will be explained later, a lead weight 4 (Fig. 10) including a semicylindrical hollowed out portion $4a$ and provided with an upper lug 5 (Fig. 7) defining a cylindrical hole adapted to register with the cylindrical passage 7 arranged in the body part $P_1$, but showing a flat wall portion 6 parallel to the plane of symmetry.

This lead weight is embedded in the molding by means of a drift (Figs. 14 and 15) that is introduced into the mold and has a substantially cylindrical shape with a diameter corresponding to that of the longitudinal passage 7. This drift includes at one end a flattened part 33 intended for the shaping of the flat part 9 of the rear portion 8 of the longitudinal passage and, at the other end, on the one hand a flattened part 31 corresponding to the flat part 6 of the lug 5 of the lead weight and, on the other hand, in a direction parallel with the first one, a flat part 32 extending over a shorter length, and defining with the latter flat part 31 the front passage 10 of rectangular cross section. The lead is drawn over the drift as shown in dots and dashes in Fig. 15 until its lug 5 abuts against the projection at the end of the flat part 31 and is thus kept in place against any longitudinal movement and against any turning movement by reason of the presence of said flat part.

The rear portion $P_2$, or tail end of the fish decoy is connected to the front portion $P_1$ of the body by a hinge $a$ shown in detail in Figs. 4 and 5. This hinge is made up of two sets of knuckle joints 14, 15 obtained by bending and folding over on each other two superimposable portions of a strip of hoop-iron 12, 13, containing at each end anchoring points $12a$, $13a$ located in its plane and, substantially in its central part, sharp points $12b$, $13b$ cut out of the iron strips, headed towards the knuckle joints of the hinge and projecting outwards. The hinge part 12 is pushed up to the bottom of the rectangular housing 11 (Fig. 9) arranged in the portion $P_1$ of the body, while the hinge part 13 is inserted in a corresponding housing arranged in the portion $P_2$. With the anchoring points $12a$, $13a$ and $12b$, $13b$ in use, an excellent joining up is obtained.

The hook gear illustrated in Fig. 11 is formed by a double hook of which the two parallel arms 17 come together at 18 and form a ring or loop 19 that is threaded in the hole 27 of a small bar 26 finished off by a terminal part 28 of a width equal to the height of the rectangular passage 10 that forms a continuation of the middle cylindrical passage 7. The part 28 is held by the fishing line at 29.

The two arms placed side by side 18 of this hook-gear are introduced edgewise (Fig. 12) through the aperture 24 into the cylindrical passage 25 of a checking stop 20 adapted to keep them in position, then they are turned into a horizontal position as shown in Fig. 13. The two edges of the aperture 24 are then set together, so as to close the checking stop as shown in Fig. 11. This stop includes a cylindrical body 20 with an upper flattened part 23, while the sizes of this checking body are slightly greater than those of the rear passage 8 so that it has to be lightly forced into the pliant material thus ensuring that it will hold fast. This arrangement allows the body of the bait to be released from the hook gear upon strike. A small flange 21 restricts the degree of entry of the stop.

What I claim is:

1. In a non-buoyant fish bait consisting of a yielding material, in combination, a front element having an upper portion and a lower portion; an air chamber formed in said upper portion of said front element, said lower portion of said front element being provided with a recess; a weight arranged in the lower portion of said front element and having projecting guiding means integral with said weight, said guiding means partially lining said recess; a link slidably arranged in said recess; a pair of hooks each having a straight portion connected to said link, said straight portion of said hooks extending rearwardly from said front element below said rear element; and curved portions forming part of said hooks, respectively, and being curved away from said rear element, said rear element having the lower side thereof curved so as to be out of contact with said hooks in any position of said rear element with respect to the pivotal axis thereof.

2. In a non-buoyant fish bait consisting of a yielding material, in combination, a front element having an upper portion and a lower portion; an air chamber formed in said upper portion of said front element, said lower portion of said front element being provided with a recess; a weight arranged in the lower portion of said front element and having a channel-shaped portion defining one wall of said recess; a link slidably arranged in said recess; a pair of hooks each having a straight portion connected to said link, said straight portion of said hooks extending rearwardly from said front element below said rear element; and curved portions forming part of said hooks, respectively, and being curved away from said rear element, said rear element having the lower side thereof curved so as to be out of contact with said hooks in any position of said rear element with respect to the pivotal axis thereof.

3. In a non-buoyant fish bait consisting of yielding material, in combination, a front element having an upper portion and a lower portion; an air chamber formed in said upper portion of said front element, said lower portion of said front element being provided with a recess; a link slidably arranged in said recess and having an aperture arranged in the front end thereof for connection with a fishing line, said link having a rear end having a hole; a double hook having two straight portions arranged at a distance from, and parallel to, each other so as to define a plane and having end portions approaching each other; a loop connecting said end portions of said straight portions of said double hook, said loop engaging said hole in said rear end of said link; a part-cylindrical body surrounding said end portions of said straight portions of said double hook and fitting into said recess of said lower portion of said front element; a rear element pivoted to the rear end of said upper portion of said front element turnably about an axis being arranged substantially at right angles to the plane defined by said straight portions of said double hook, said straight portions of said double hook extending rearwardly from said front element below said rear element; and curved portions forming part of said double hook and being curved away from said rear element, said rear element having the lower side thereof curved so as to be out of contact with said double hook in any position of said rear element with respect to the pivotal axis thereof.

4. In a non-buoyant fish bait consisting of yielding material, in combination, a front element having an upper portion and a lower portion; an air chamber formed in said upper portion of said front element, said lower portion of said front element being provided with a recess; a link slidably arranged in said recess and having an aperture arranged in the front end thereof for connection with a fishing line, said link having a rear end having a hole; a double hook having two straight portions being arranged at a distance from, and parallel to, each other so as to define a plane and having end portions approaching each other; a loop connecting said end portions of said straight portions of said double hook, said loop engaging said hole in said rear end of said link; a part-cylindrical body having a flange and a flattened upper part and surrounding said end portions of said straight portions of said double hook and fitting into said recess of said lower portion of said front element, said cylindrical body provided with said flange limiting the sliding motion of said link in one direction in said recess and holding by said flattened part thereof said straight portions of said double hook in a predetermined plane; a rear element pivoted to the rear end of said upper portion of said front element turnably about an axis arranged substantially at right angles to the plane defined by said straight portions of said double hook, said straight portions of said double hook extending rearwardly from said front element below said rear element; and curved portions forming part of said double hook and being curved away from said rear element, said rear element having the lower side thereof curved so as to be out of contact with said double hook in any position of said rear element with respect to the pivotal axis thereof.

5. In a non-buoyant fish bait consisting of yielding material, in combination, a front element having an upper portion and a lower portion; an air chamber formed in said upper portion of said front element, said lower portion of said front element being provided with a recess; a weight arranged in the lower portion of said front element and having projecting guiding means integral with said weight, said guiding means embracing said recess; a link slidably arranged in said recess and having an aperture arranged in the front end thereof for connection with a fishing line, said link having a rear end having a hole; a double hook having two straight portions arranged at a distance from, and parallel to, each other so as to define a plane and having end portions approaching each other; a loop connecting said end portions of said straight portions of said double hook, said loop engaging said hole in said rear end of said link; a part-cylindrical body surrounding said end portions of said straight portions of said double hook and fitting into said recess of said lower portion of said front element; a rear element pivoted to the rear end of said upper portion of said front element turnably about an axis being arranged substantially at right angles to the plane defined by said straight portions of said double hook, said straight portions of said double hook extending rearwardly from said front element below said rear element; and curved portions forming part of said double hook and curved away from said rear element, said rear element having the lower side thereof curved so as to be out of contact with said double hook in any position of said rear element with respect to the pivotal axis thereof.

6. In a non-buoyant fish bait consisting of a yielding material, in combination, a front element having an upper portion and a lower portion; an air chamber formed in said upper portion of said front element, said lower portion of said front element being provided with a recess; a weight arranged in the lower portion of said front element and having projecting guiding means integral with said weight, said guiding means partially lining said recess; a link slidably arranged in said recess; and a pair of hooks each having a straight portion connected to said link.

7. In a non-buoyant fish bait consisting of yielding material, in combination, a front element having an upper portion and a lower portion; an air chamber formed in said upper portion of said front element, said lower portion of said front element being provided with a recess; a link slidably arranged in said recess and having an aperture arranged in the front end thereof for connection with a fishing line, said link having a rear end having a hole; a double hook having two straight portions arranged at a distance from, and parallel to, each other so as to define a plane and having end portions approaching each other; a loop connecting said end portions of said straight portions of said double hook, said loop engaging said hole in said rear end of said link; and a part-cylindrical body surrounding said end portions of said straight portions of said double hook and fitting into said recess of said lower portion of said front element.

8. In a non-buoyant fish bait consisting of yielding material, in combination, a front element having an upper portion and a lower portion; an air chamber formed in said upper portion of said front element, said lower portion of said front element being provided with a recess; a link slidably arranged in said recess and having an aperture arranged in the front end thereof for connection with a fishing line, said link having a rear end having a hole; a double hook having two straight portions arranged at a distance from, and parallel to, each other so as to define a plane and having end portions approaching each other; a loop connecting said end portions of said straight portions of said double hook, said loop engaging said hole in said rear end of said link; and a part-cylindrical body having a flange and a flattened upper part and surrounding said end portions of said straight portions of said double hook and fitting into said recess of said lower portion of said front element, said part-cylindrical body provided with said flange limiting the sliding motion of said link in said recess in one direction and holding by said flattened part thereof said straight portions of said double hook in a predetermined plane.

9. In a non-buoyant fish bait consisting of yielding material, in combination, a front element having an upper portion and a lower portion; an air chamber formed in said upper portion of said front element, said lower portion of said front element being provided with a recess; a weight arranged in the lower portion of said front element and having projecting guiding means integral with said weight, said guiding means partially lining said recess; a link slidably arranged in said recess and having an aperture arranged in the front end thereof for connection with a fishing line, said link having a rear end having a hole; a double hook having two straight portions arranged at a distance from, and parallel to, each other so as to define a plane and having end portions approaching each other; a loop connecting said end portions of said straight portions of said double hook, said loop engaging said hole in said rear end of said link; and a part-cylindrical body surrounding said end portions of said straight portions of said double hook and fitting into said recess of said lower portion of said front element.

10. A non-buoyant fish bait having the shape of a small fresh water fish and consisting of yielding material, comprising in combination, a front element having an upper portion and a lower portion, said upper portion having a resilient wall forming an air chamber, said lower portion having a resilient wall portion being outwardly designed as the belly portion of a fresh water fish; a weight arranged in said lower portion and extending substantially below said air chamber and at a distance therefrom, said weight having a lower contour which is rounded so as to correspond to the shape of the belly of a small fresh water fish, said resilient wall portion of said lower portion having below said weight a thickness which is just sufficient for maintaining said weight in position so that the bait is immersible in water with said air chamber above said weight, whereby said front element is kept in a substantially horizontal position; and a rear element pivoted to the rear end of said upper portion of said front element turnably about an axis substantially parallel to the vertical direction assumed by the bait immersed in water.

11. In a non-buoyant fish bait consisting of yielding material, in combination, a front element having an upper portion and a lower portion; an air chamber formed in said upper portion of said front element, said lower portion of said front element being provided with a recess; a link slidably arranged in said recess and having an aperture arranged in the front end thereof for connection with a fishing line, said link having a rear end having a hole; a double hook having two straight portions being arranged at a distance from, and parallel to, each other so as to define a plane and having end portions approaching each other; a loop connecting said end portions of said straight portions of said double hook, said loop engaging said hole in said rear end of said link; a part-cylindrical body surrounding said end portions of said straight portions of said double hook and fitting into said recess of said lower portion of said front element; a rear element pivoted to the rear end of said upper portion of said front element turnably about an axis arranged substantially at right angles to the plane defined by said straight portions of said double hook, said straight portions of said double hook extending rearwardly from said front element below said rear element; curved portions forming part of said double hook and being curved away from said rear element, said rear element having the lower side thereof curved so as to be out of contact with said double hook in any position of said rear element with respect to the pivotal axis thereof; and a vane consisting of yielding material and forming part of said lower portion of said front element, said vane extending substantially at an inclination downward from the apertured front end of said link.

12. In a non-buoyant fish bait consisting of yielding material, in combination, a front element having an upper portion and a lower portion; an air chamber formed in said upper portion of said front element; a pair of hooks each having a straight portion connected to said lower portion of said front element, said straight portions of said hooks being arranged parallel to each other so as to define a plane; a rear element pivoted to the rear end of said upper portion of said front element turnably about an axis being arranged substantially at right angles to the plane defined by said straight portions of said hooks, said straight portions of said hooks extending rearwardly from said front element below said rear element; curved portions forming part of said hooks, respectively, and being curved away from said rear element, said rear element having the lower side thereof curved so as to be out of contact with said hooks in any position of said rear element with respect to the pivotal axis thereof; a strip-shaped member in each of said front and rear elements; a hinge connecting said strip-shaped members; and points forming part of said strip-shaped members and turned toward said hinge so as to establish a strong connection of said front and rear elements by said strip-shaped members.

13. A non-buoyant fish bait having the shape of a small fresh water fish and consisting of yielding material, comprising, in combination, a front element having an upper portion and a lower portion, said upper portion having a resilient wall forming an air chamber, said lower portion having a resilient wall portion being outwardly designed as the belly portion of a fresh water fish; a weight arranged in said lower portion and extending substantially below said air chamber and at a distance therefrom, said weight having a lower contour which is rounded so as to correspond to the shape of the belly of a small fresh water fish, said resilient wall portion of said lower portion having below said weight a thickness which is just sufficient for maintaining said weight in position so that the bait is immersible in water with said air chamber above said weight, whereby said front element is kept in a substantially horizontal position; a rear element pivoted to the rear end of said upper portion of said front element turnably about an axis being substantially parallel to the vertical direction assumed by the bait immersed in water, a strip-shaped member in each of said front and rear elements; a hinge connecting said strip-shaped members; and points forming part of said strip-shaped members and turned toward said hinge so as to establish a strong connection of said front and rear elements by said strip-shaped members.

ROGER BOCCHINO.

REFERENCES CITED

The following references are of record in the file of this patent:

UNITED STATES PATENTS

| Number | Name | Date |
|---|---|---|
| 471,548 | Haviland | Mar. 29, 1892 |
| 1,177,281 | Schweickert | Mar. 28, 1916 |
| 1,390,458 | Moree | Sept. 13, 1921 |
| 1,394,355 | Robinson | Oct. 18, 1921 |
| 1,540,702 | Morriss | June 2, 1925 |
| 1,828,574 | Neukam | Oct. 20, 1931 |
| 2,017,903 | Johnson | Oct. 22, 1935 |
| 2,106,755 | McArthur | Feb. 1, 1938 |
| 2,149,054 | Jones | Feb. 28, 1939 |
| 2,235,600 | Ammerman | Mar. 18, 1941 |